United States Patent
Singh et al.

(10) Patent No.: US 11,191,291 B2
(45) Date of Patent: Dec. 7, 2021

(54) COMPOSITIONS FOR TASTE MASKING

(71) Applicant: International Flavors & Fragrances Inc., New York, NY (US)

(72) Inventors: Ajay Pratap Singh, Highland Park, NJ (US); Hsi-Wen Chin, Tinton Falls, NJ (US); Jung-A Kim, Edgewater, NJ (US); Thumpalasseril V. John, Morganville, NJ (US)

(73) Assignee: International Flavors & Fragrances Inc., Union Beach, NJ (US)

( * ) Notice: Subject to any disclaimer, the term of this patent is extended or adjusted under 35 U.S.C. 154(b) by 242 days.

(21) Appl. No.: 16/469,469

(22) PCT Filed: Dec. 14, 2017

(86) PCT No.: PCT/US2017/066316
§ 371 (c)(1),
(2) Date: Jun. 13, 2019

(87) PCT Pub. No.: WO2018/112148
PCT Pub. Date: Jun. 21, 2018

(65) Prior Publication Data
US 2020/0037647 A1    Feb. 6, 2020

Related U.S. Application Data
(60) Provisional application No. 62/434,510, filed on Dec. 15, 2016.

(51) Int. Cl.
| | |
|---|---|
| A23L 27/00 | (2016.01) |
| A23L 29/206 | (2016.01) |
| A23L 27/30 | (2016.01) |
| A23L 29/00 | (2016.01) |
| A23L 2/60 | (2006.01) |

(52) U.S. Cl.
CPC .......... *A23L 27/84* (2016.08); *A23L 2/60* (2013.01); *A23L 27/30* (2016.08); *A23L 27/86* (2016.08); *A23L 29/03* (2016.08); *A23L 29/206* (2016.08)

(58) Field of Classification Search
CPC ........ A23L 27/84; A23L 29/206; A23L 27/86; A23L 27/30; A23L 29/03; A23L 2/60
USPC ................... 426/539, 548, 590, 538
See application file for complete search history.

(56) References Cited

U.S. PATENT DOCUMENTS 5,510,123 A * 4/1996 Mitchell et al.
2014/0271996 A1 * 9/2014 Prakash et al.

OTHER PUBLICATIONS

Science Direct, www.sciencedirect.com/topics/neuroscience/galacturonic-acid. 2003, pp. 1-17. (Year: 2003).*

* cited by examiner

*Primary Examiner* — Helen F Heggestad

(57) ABSTRACT

The use of mucic acid gallate compounds in a non-sugar sweetener such as a steviol glycoside-containing consumable to provide lingering aftertaste specific masking effect is provided.

14 Claims, No Drawings

COMPOSITIONS FOR TASTE MASKING

STATUS OF RELATED APPLICATION

This application claims priority to U.S. Provisional Application No. 62/434,510, filed Dec. 15, 2016, the content hereby incorporated by reference as if set forth in its entirety.

FIELD OF THE INVENTION

The present invention relates to novel compositions and methods for masking the unpleasant lingering aftertaste in a non-sugar sweetener such as a steviol glycoside-containing consumable.

BACKGROUND OF THE INVENTION

Non-sugar sweeteners such as steviol glycosides have been widely used as noncaloric sweeteners to substitute sugar. However, those non-sugar sweeteners exhibit unpleasant lingering flavor such as bitter and metallic aftertaste and lingering sweetness, which limits their applications in consumables. Thus, it is of particular need to develop taste modifiers that mask their unpleasant lingering aftertaste. Such modifiers selectively mask the bitter and metallic aftertaste and lingering sweetness without impacting the other flavors in a non-sugar sweetener-containing consumable.

SUMMARY OF THE INVENTION

This invention provides novel mucic acid gallate compositions and methods for use thereof in selective masking the unpleasant lingering aftertaste of a non-sugar sweetener.

In one embodiment, the present invention is directed to a method of masking the unpleasant lingering aftertaste of a non-sugar sweetener in a consumable containing the non-sugar sweetener by adding an olfactory effective amount of a compound selected from the group consisting of mucic acid 2-O-gallate, mucic acid 3-O-gallate, mucic acid lactone gallate, and a mixture thereof represented by formulas set forth below to the consumable:

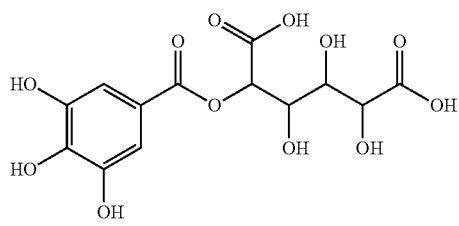

Mucic acid 2-O-gallate

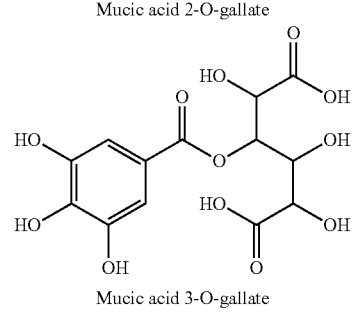

Mucic acid 3-O-gallate

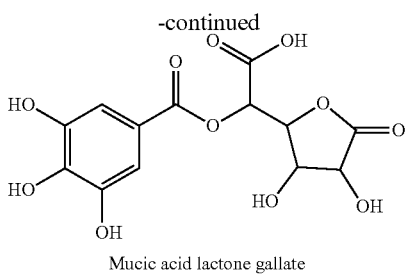

Mucic acid lactone gallate

In one embodiment, the present invention is directed to a method of masking the lingering aftertaste of a steviol glycoside in a consumable containing the steviol glycoside by adding an olfactory effective amount of a compound selected from the group consisting of mucic acid 2-O-gallate, mucic acid 3-O-gallate, mucic acid lactone gallate, and a mixture thereof to the consumable.

In another embodiment, the present invention is directed to a method of masking the lingering aftertaste of a steviol glycoside in a consumable containing the steviol glycoside by adding an olfactory effective amount of a compound selected from the group consisting of mucic acid 2-O-gallate, mucic acid 3-O-gallate, mucic acid lactone gallate, and a mixture thereof to the consumable and the compound is provided as an *Emblica officinalis* fruit extract.

In another embodiment, the present invention is directed to a method of masking the lingering aftertaste of a steviol glycoside in a consumable containing the steviol glycoside by adding an olfactory effective amount of a mucic acid 2-O-gallate and mucic acid lactone gallate mixture to the consumable.

In another embodiment, the present invention is directed to a method of masking the lingering aftertaste of a steviol glycoside in a consumable containing the steviol glycoside by adding an olfactory effective amount of a mucic acid 2-O-gallate and mucic acid lactone gallate mixture to the consumable, wherein mucic acid 2-O-gallate and mucic acid lactone gallate have a weight ratio of from about 0.75-2.20.

In another embodiment, the present invention is directed to a composition comprising a no-sugar sweetener and an olfactory effective amount of a compound selected from the group consisting of mucic acid 2-O-gallate, mucic acid 3-O-gallate, mucic acid lactone gallate, and a mixture thereof.

In another embodiment, the present invention is directed to a composition comprising a steviol glycoside and an olfactory effective amount of a compound selected from the group consisting of mucic acid 2-O-gallate, mucic acid 3-O-gallate, mucic acid lactone gallate, and a mixture thereof.

In another embodiment, the present invention is directed to a composition comprising a steviol glycoside and an olfactory effective amount of a compound selected from the group consisting of mucic acid 2-O-gallate, mucic acid 3-O-gallate, mucic acid lactone gallate, and a mixture thereof to the consumable and the compound is provided as an *Emblica officinalis* fruit extract.

In another embodiment, the present invention is directed to a composition comprising a steviol glycoside and an olfactory effective amount of a mucic acid 2-O-gallate and mucic acid lactone gallate mixture.

In another embodiment, the present invention is directed to a composition comprising a steviol glycoside and an olfactory effective amount of a mucic acid 2-O-gallate and mucic acid lactone gallate mixture, wherein mucic acid 2-O-gallate and mucic acid lactone gallate have a weight ratio of from about 0.75-2.20.

In another embodiment, the present invention is directed to a consumable comprising a no-sugar sweetener and an olfactory effective amount of a compound selected from the group consisting of mucic acid 2-O-gallate, mucic acid 3-O-gallate, mucic acid lactone gallate, and a mixture thereof.

In another embodiment, the present invention is directed to a consumable comprising a steviol glycoside and an olfactory effective amount of a compound selected from the group consisting of mucic acid 2-O-gallate, mucic acid 3-O-gallate, mucic acid lactone gallate, and a mixture thereof.

In another embodiment, the present invention is directed to a consumable comprising a steviol glycoside and an olfactory effective amount of a compound selected from the group consisting of mucic acid 2-O-gallate, mucic acid 3-O-gallate, mucic acid lactone gallate, and a mixture thereof to the consumable and the compound is provided as an *Emblica officinalis* fruit extract.

In another embodiment, the present invention is directed to a consumable comprising a steviol glycoside and an olfactory effective amount of a mucic acid 2-O-gallate and mucic acid lactone gallate mixture.

In another embodiment, the present invention is directed to a consumable comprising a steviol glycoside and an olfactory effective amount of a mucic acid 2-O-gallate and mucic acid lactone gallate mixture, wherein mucic acid 2-O-gallate and mucic acid lactone gallate have a weight ratio of from about 0.75-2.20.

These and other embodiments of the present invention will be apparent by reading the following specification.

DETAILED DESCRIPTION OF THE INVENTION

Artificial sweeteners and other sugar substitutes are commonly used in diet to reduce the sugar and calories. Sugar substitutes are any non-sugar sweeteners. Artificial sweeteners are considered one type of sugar substitutes. Some popular artificial sweeteners include acesulfame potassium, aspartame, neotame, saccharin, sucralose and advantame. Other popular sugar substitutes include sugar alcohols such as erythritol, hydrogenated starch hydrolysate, isomalt, lactitol, maltitol, mannitol, sorbitol and xylitol; natural sweeteners such as agave nectar, date sugar, fruit juice concentrate, honey, maple syrup and molasses; and other sweeteners such as steviol glycosides, tagatose and trehalose. Steviol glycosides containing one or more intensely sweet glycosides are natural constituents of the plant *Stevia rebaudiana* (*S. rebaudiana*), which belongs to the sunflower family (Compositae or Asteraceae). The leaves of *S. rebaudiana* contain different steviol glycosides. The major constituent is stevioside (triglucosylated steviol). Other main constituents include rebaudioside A (tetraglucosylated steviol), rebaudioside C and dulcoside A. Steviol glycosides also occur in the related species *Stevia phlebophylla* and in the plant *Rubus chingii* of the rose family (Rosaceae).

Artificial sweeteners and some other sugar substitutes such as steviol glycosides are intense sweeteners and are many times sweeter than regular sugar. However, these non-sugar sweeteners leave unpleasant lingering flavor such as bitter and metallic aftertaste and lingering sweetness, which limits their applications in consumables. Thus, it is of particular need to develop taste modifiers that mask the unpleasant lingering aftertaste of sugar substitutes such as steviol glycosides. A desirable taste modifier selectively masks the bitter and metallic aftertaste and lingering sweetness without impacting the other flavors in steviol glycoside-containing consumables.

A steviol glycoside is understood to mean a naturally occurring compound as described above or a derivative thereof. The steviol glycoside of the present invention includes, for example, but not limited to, steviolmonoside, steviol-19-O-β-D-glucoside, rubusoside, steviolbioside, stevioside, rebaudioside A, rebaudioside B, rebaudioside C, rebaudioside D, rebaudioside E, rebaudioside F, rebaudioside G, rebaudioside H, rebaudioside I, rebaudioside J, rebaudioside K, rebaudioside L, rebaudioside M, rebaudioside N, rebaudioside O, dulcoside A, dulcoside B, isosteviol-19-O-β-D-glucoside, 15β-hydroxyrubusoside, 15-oxorubusoside, suavioside A, suavioside B, suavioside C1, suavioside C2, suavioside D1, suavioside D2, suavioside E, suavioside F, suavioside G, suavioside H, suavioside I, suavioside J, suavioside K, suavioside L, suavioside Q1, suavioside Q2, suavioside R1, suavioside R2, suavioside S1, suavioside S2, 9-hydroxysuavioside H, 9-hydroxysuavioside J, 15-oxosuavioside L, 15-oxo-16-epi-suavioside L, 16β-hydroxysuavioside L, 16α-hydroxysuavioside L, paniculoside IV, sugeroside, a derivative such as a glycosylated derivative thereof and a combination thereof. The glycosylated derivatives can be prepared via transglycosylation reactions with, for example, but not limited to, glucose, fructose, galactose, rhamnose, ribose, mannose, arabinose, fucose, maltose, lactose, sucrose, rutinose, sorbose, xylulose, ribulose, rhammulose and xylose. The term "a non-sugar sweetener" is understood to mean one or more of the non-sugar sweeteners as described herein. The term "a steviol glycoside" is understood to mean one or more of the steviol glycosides as described herein.

Mucic acid gallate compounds including mucic acid 2-O-gallate, mucic acid 3-O-gallate and mucic acid lactone gallate are among the most abundant compounds found in the extracts of the fruits of *Emblica officinalis* (also referred to as *Phyllanthus emblica* or as Amla) (Zhang, et al. (2001) Chemical & Pharmaceutical Bulletin 49(5):537-540; She, et al. (2013) Natural Product Communications 8(4):461-462). The extracts of *Emblica officinalis* fruits have manifested health benefits in vitro and in animal studies. However, very little has been reported on the flavor use of mucic acid gallate compounds. It has now been discovered that mucic acid 2-O-gallate, mucic acid 3-O-gallate and mucic acid lactone gallate are effective in masking the unpleasant lingering aftertaste caused by steviol glycosides. The mucic acid 2-O-gallate and mucic acid lactone gallate mixture is particularly effective. Further, only when in specified mixing ratios, the mucic acid 2-O-gallate and mucic acid lactone gallate mixture possesses a desired degree of lingering aftertaste masking effect that is suitable for flavor applications. The fruits of *Emblica officinalis* can be obtained commercially (for example, available at ChromaDex, Inc., California, U.S.). Mucic acid 3-O-gallate can also be obtained commercially (Quality Phytochemicals, LLC, New Jersey, U.S.). The term "a compound" is understood to mean one or more of the mucic acid gallate compounds as described herein. In certain embodiments, the compound is a mixture of mucic acid 2-O-gallate and mucic acid lactone gallate. In further embodiments, the mixture of mucic acid 2-O-gallate and mucic acid lactone gallate is provided as an *Emblica officinalis* fruit extract. In furthermore embodiments, the mixture has a mucic acid 2-O-gallate and mucic acid lactone gallate weight ratio of from about 0.75-2.20.

A consumable includes, for example, a food product (e.g., a beverage), a sweetener such as a natural sweetener or an artificial sweetener, a pharmaceutical composition, a dietary supplement, a nutraceutical, a dental hygienic composition and a cosmetic product. The consumable may further contain a flavoring. The term "a non-sugar sweetener-containing consumable" is understood to mean a consumable that contains a non-sugar sweetener. The term "a steviol glycoside-containing consumable" is understood to mean a consumable that contains one or more of the steviol glycosides as described herein.

In some embodiments, a consumable is a food product including, for example, but not limited to, fruits, vegetables, juices, meat products such as ham, bacon and sausage, egg products, fruit concentrates, gelatins and gelatin-like products such as jams, jellies, preserves and the like, milk products such as ice cream, sour cream and sherbet, icings, syrups including molasses, corn, wheat, rye, soybean, oat, rice and barley products, nut meats and nut products, cakes, cookies, confectionaries such as candies, gums, fruit flavored drops, and chocolates, chewing gums, mints, creams, pies and breads. In a certain embodiment, the food product is a beverage including, for example, but not limited to, coffee, tea, carbonated soft drinks, such as COKE and PEPSI, non-carbonated soft drinks and other fruit drinks, sports drinks such as GATORADE and alcoholic beverages such as beers, wines and liquors. A consumable also includes prepared packaged products, such as granulated flavor mixes, which upon reconstitution with water provide non-carbonated drinks, instant pudding mixes, instant coffee and tea, coffee whiteners, malted milk mixes, pet foods, livestock feed, tobacco, and materials for baking applications, such as powdered baking mixes for the preparation of breads, cookies, cakes, pancakes, donuts and the like. A consumable also includes diet or low-calorie food and beverages containing little or no sucrose. A preferred consumable includes carbonated beverages. Consumables further include condiments such as herbs, spices and seasonings, flavor enhancers (e.g., monosodium glutamate), dietetic sweeteners and liquid sweeteners.

In other embodiments, a consumable is a pharmaceutical composition, a dietary supplement, a nutraceutical, a dental hygienic composition or a cosmetic product. Preferred compositions are pharmaceutical compositions containing naringenin, one or more pharmaceutically acceptable excipients, and one or more active agents that exert a biological effect other than sweetness enhancement. Such active agents include pharmaceutical and biological agents that have an activity other than taste enhancement. Such active agents are well known in the art (See, e.g., The Physician's Desk Reference). Such compositions can be prepared according to procedures known in the art, for example, as described in Remington's Pharmaceutical Sciences, Mack Publishing Co., Easton, Pa. In one embodiment, such an active agent includes a bronchodilator, an anorexiant, an antihistamine, a nutritional supplement, a laxative, an analgesic, an anesthetic, an antacid, a H2-receptor antagonist, an anticholinergic, an antidiarrheal, a demulcent, an antitussive, an antinauseant, an antimicrobial, an antibacterial, an antifungal, an antiviral, an expectorant, an anti-inflammatory agent, an antipyretic, and a mixture thereof. In another embodiment, the active agent is selected from the group consisting of an antipyretic and analgesic, e.g., ibuprofen, acetaminophen or aspirin, a laxative, e.g., phenolphthalein dioctyl sodium sulfosuccinate, an appetite depressant, e.g., an amphetamine, phenylpropanolamine, phenylpropanolamine hydrochloride, or caffeine, an antacid, e.g., calcium carbonate, an antiasthmatic, e.g., theophylline, an antidiarrheal, e.g., diphenoxylate hydrochloride, an agent against flatulence, e.g., simethecon, a migraine agent, e.g., ergotamine tartrate, a psychopharmacological agent, e.g., haloperidol, a spasmolytic or sedative, e.g., phenobarbital, an antihyperkinetic, e.g., methyldopa or methylphenidate, a tranquilizer, e.g., a benzodiazepine, hydroxyzine, meprobramate or phenothiazine, an antihistaminic, e.g., astemizol, chlorpheniramine maleate, pyridamine maleate, doxlamine succinate, brompheniramine maleate, phenyltoloxamine citrate, chlorcyclizine hydrochloride, pheniramine maleate, or phenindamine tartrate, a decongestant, e.g., phenylpropanolamine hydrochloride, phenylephrine hydrochloride, pseudoephedrine hydrochloride, pseudoephedrine sulfate, phenylpropanolamine bitartrate, or ephedrine, a beta-receptor blocker, e.g., propranolol, an agent for alcohol withdrawal, e.g., disulfuram, an antitussive, e.g., benzocaine, dextromethorphan, dextromethorphan hydrobromide, noscapine, carbetapentane citrate, and chlophedianol hydrochloride, a fluorine supplement, e.g., sodium fluoride, a local antibiotic, e.g., tetracycline or clindamycin, a corticosteroid supplement, e.g., prednisone or prednisolone; an agent against gout, e.g., colchicine or allopurinol, an antiepileptic, e.g., phenytoin sodium, an agent against dehydration, e.g., electrolyte supplements, an antiseptic, e.g., cetylpyridinium chloride, a NSAID, e.g., acetaminophen, ibuprofen, naproxen, or a salt thereof, a gastrointestinal active agent, e.g., loperamide and famotidine, an alkaloid, e.g., codeine phosphate, codeine sulfate, or morphine, a supplement for trace elements, e.g., sodium chloride, zinc chloride, calcium carbonate, magnesium oxide, and other alkali metal salts and alkali earth metal salts; a vitamin, an ion-exchange resin, e.g., cholestyramine, a cholesterol-depressant and lipid-lowering substance, an antiarrhythmic, e.g., N-acetylprocainamide and an expectorant, e.g., guaifenesin. Examples of dietary supplements or nutraceuticals include, for example, but are not limited to, an enteral nutrition product for treatment of nutritional deficit, trauma, surgery, Crohn's disease, renal disease, hypertension, obesity and the like, to promote athletic performance, muscle enhancement or general well-being or inborn errors of metabolism such as phenylketonuria. In particular, such compositions can contain one or more amino acids which have a bitter or metallic taste or aftertaste. Such amino acids include, for example, but are not limited to, an essential amino acid such as L isomers of leucine, isoleucine, histidine, lysine, methionine, phenylalanine, threonine, tryptophan, tyrosine and valine. Dental hygienic compositions are known in the art and include, for example, but not limited to, a toothpaste, a mouthwash, a plaque rinse, a dental floss, a dental pain reliever (such as ANBESOL) and the like. In one embodiment, the dental hygienic composition includes one natural sweetener. In another embodiment, the dental hygienic composition includes more than one natural sweetener. In yet another embodiment, the dental hygienic composition includes sucrose and corn syrup, or sucrose and aspartame. A cosmetic product includes, for example, but not limited to, a face cream, a lipstick, a lip gloss and the like. Other suitable cosmetic products of use in this invention include a lip balm, such as CHAPSTICK or BURT'S BEESWAX Lip Balm.

In some embodiments, a flavoring includes, for example, but are not limited to, Natural Sweet Flavor #2 (WO 2012/129451), stevioside, rebaudioside A, rebaudioside B, rebaudioside C, rebaudioside D, rebaudioside E, rebaudioside F, dulcoside A, dulcoside B, *stevia*, alpha-glucosyl *stevia*, fructosyl *stevia*, galactosyl *stevia*, beta-glucosyl *stevia*, siamenoside, mogroside IV, mogroside V, Luo Han Guo sweetener, monatin and its salts, glycyrrhizic acid and its salts (e.g., as found in MAGNASWEET), curculin, thaumatin, monellin, mabinlin, brazzein, hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrusoside A, cyclocarioside I or a combination thereof.

The term "olfactory effective amount" is understood to mean the amount of a compound used in a consumable to mask the lingering aftertaste of a steviol glycoside, wherein the compound reduces and/or suppresses the lingering aftertaste of a steviol glycoside in the consumable. The olfactory effective amount may vary depending on many factors including other ingredients, their relative amounts and the olfactory effect that is desired. Any amount of a lingering aftertaste masking compound that provides the desired degree of lingering aftertaste masking effect without exhibiting off-taste can be used. In certain embodiments, the olfactory effective amount ranges from about 1 part per billion to about 1000 parts per million by weight, more preferably from about 100 parts per billion to about 500 parts per million by weight, even more preferably from about 0.5 to about 100 parts per million by weight. The term "ppb" is understood to mean part per billion by weight. The term "ppm" is understood to mean part per million by weight.

Additional materials can also be used in conjunction with the compounds of the present invention to encapsulate and/or deliver the lingering aftertaste masking effect. Some well-known materials are, for example, but not limited to, polymers, oligomers, other non-polymers such as surfactants, emulsifiers, lipids including fats, waxes and phospholipids, organic oils, mineral oils, petrolatum, natural oils, perfume fixatives, fibers, starches, sugars and solid surface materials such as zeolite and silica. Some preferred polymers include polyacrylate, polyurea, polyurethane, polyacrylamide, polyester, polyether, polyamide, poly(acrylate-co-acrylamide), starch, silica, gelatin and gum Arabic, alginate, chitosan, polylactide, poly(melamine-formaldehyde), poly(urea-formaldehyde), or a combination thereof.

The invention is described in greater detail by the following non-limiting examples. Materials were purchased from Aldrich Chemical Company unless noted otherwise.

Example I: Preparation of *Emblica officinalis* Fruit Extract

The juice extracts of *Emblica officinalis* fruits were prepared using water or organic solvents according to procedures known in the art (Zhang, et al. (2001) Chemical & Pharmaceutical Bulletin 49(5):537-540; Bhattacharya, et al. (1999) Indian Journal of Experimental Biology 37(7):676-680). The juice extracts were further extracted and purified to provide an extract mixture of mucic acid 2-O-gallate and mucic acid lactone gallate. Among different batches prepared, mucic acid 2-O-gallate and mucic acid lactone gallate were identified, ranging from ~3-20% and from ~2.5-10%, respectively. Another abundant compound in the extract, galloyl glucose ranging from ~15-35%, was also identified and used as a control compound in the evaluation. Unless otherwise specified, percentages (% s) are by weight.

Subsequent fractionation was performed using high performance liquid chromatography (HPLC) to further provide fractions containing each of mucic acid 2-O-gallate, mucic acid lactone gallate and galloyl glucose. Mucic acid 3-O-gallate was purchased (Quality Phytochemicals, LLC, New Jersey, U.S.).

Example II: Masking of the Lingering Aftertaste of Steviol Glycosides by Mucic Acid 2-O-Gallate and Mucic Acid Lactone Gallate A base solution of αG SWEET (Alpha Glucosyl Stevioside, Toyo Sugar Refining Co., Ltd., Japan) was prepared in water at a concentration of 0.08%. Test sample solutions of mucic acid 2-O-gallate and mucic acid lactone gallate (prepared as above in Example I) in the base solution at the levels shown in the table below were each prepared.

Sample pairs (a base solution and a test sample solution) were presented in a blind and pseudorandom order to a sensory panel. The lingering aftertaste-masking effect was recorded based on the percentages of the panelists who ranked the sample having less bitter and metallic aftertaste and lingering sweetness. Binomial statistical analysis was used to compare the masking effect of lingering aftertaste for each sample pair. Significance was at 95% Confidence Interval ($p<0.05$). The test results are as follows:

| Sample Solution | Result | p Value |
| --- | --- | --- |
| Mucic acid 2-O-gallate (20 ppm) | Less bitterness, metallic aftertaste and lingering sweetness than the base solution | <0.01* |
| Mucic acid 2-O-gallate (15 ppm) | Less bitterness, metallic aftertaste and lingering sweetness than the base solution | <0.05* |
| Mucic acid lactone gallate (2 ppm) | Less bitterness, metallic aftertaste and lingering sweetness than the base solution | <0.05* |

*Mucic acid 2-O-gallate and mucic acid lactone gallate masked the lingering aftertaste of steviol glycosides.

Example III: Masking of the Lingering Aftertaste of Steviol Glycosides by the Mucic Acid 2-O-Gallate and Mucic Acid Lactone Gallate Mixture A solution of αG SWEET was prepared in water at a concentration of 0.14%. The *Emblica officinalis* fruit extract (prepared as above in Example I) containing the mucic acid 2-O-gallate (11.84%) and mucic acid lactone gallate (6.35%) mixture, individual fractions containing each of mucic acid 2-O-gallate, mucic acid lactone gallate, galloyl glucose (prepared in Example I) and mucic acid 3-O-gallate (Quality Phytochemicals, LLC, New Jersey, U.S.) were added to the αG SWEET solution, respectively, to achieve a series of concentrations ranging from about 50-80 ppm for the *Emblica officinalis* fruit extract; about 5-20 ppm for mucic acid 2-O-gallate; about 5-20 ppm for mucic acid 3-O-gallate; about 2-10 ppm for mucic acid lactone gallate; and about 10-20 ppm for galloyl glucose. Water was used in a control group.

Samples were presented in a blind and pseudorandom order to a sensory panel. The lingering aftertaste-masking effect was evaluated by ranking the suppression of bitterness, metallic aftertaste and lingering sweetness on a scale of 0-5, where 0=no masking and 5=very strong masking. The test results are exemplified in the following:

| Sample | Masking Effect |
| --- | --- |
| *Emblica officinalis* Fruit Extract (80 ppm) | 5 |
| Mucic Acid 2-O-Gallate (20 ppm) | 1 |

-continued

| Sample | Masking Effect |
|---|---|
| Mucic Acid 3-O-Gallate (20 ppm) | 1 |
| Mucic Acid Lactone Gallate (10 ppm) | 2 |
| Galloyl Glucose (20 ppm) | 0 |

Compared with the control, the samples of (i) *Emblica officinalis* fruit extract; (ii) mucic acid 2-O-gallate; (iii) mucic acid 3-O-gallate and (iv) mucic acid lactone gallate tasted considerably less bitter and the lingering metallic off-note was reduced. However, galloyl glucose exhibited very low effect.

Thus, (i) *Emblica officinalis* fruit extract; (ii) mucic acid 2-O-gallate; (iii) mucic acid 3-O-gallate; and (iv) mucic acid lactone gallate exhibited unexpected masking effect of the lingering aftertaste of steviol glycosides. In particular, such advantageous property of the *Emblica officinalis* fruit extract containing a mucic acid 2-O-gallate and mucic acid lactone gallate mixture was surprisingly superior.

Example IV: Masking of the Lingering Aftertaste of Different Non-Sugar Sweeteners by Mucic Acid 2-O-Gallate and Mucic Acid Lactone Gallate Mixture Different base solutions of non-sugar sweeteners including (i) acesulfame potassium (0.02%); (ii) aspartame (0.02%); (iii) sucralose (0.01%); and (iv) αG SWEET (0.04%) were prepared in water. Test sample solutions of the *Emblica officinalis* fruit extract (prepared as above in Example I) containing the mucic acid 2-O-gallate (11.84%) and mucic acid lactone gallate (6.35%) mixture were prepared in each base solution at a concentration of 70 ppm.

Sample pairs (a base solution and a test sample solution) were presented in a blind and pseudorandom order to a sensory panel. The test results are as follows:

| Non-Sugar Sweeteners | Result |
|---|---|
| Acesulfame Potassium (0.02%) | Less overall off-taste but not too significant, decreased sweetness up front, slightly decreased lingering, slight reduction of mineral and waxy off-taste |
| Aspartame (0.02%) | Slightly decreased off-taste up front, very slightly decreased drying, very little to no reduction in sweetness, more aspartame impact |
| Sucralose (0.01%) | Less overall off-taste, slightly decreased astringency, less metallic on the backend but still some up front, decreased sweetness up front, less sucralose impact up front |
| αG SWEET (0.04%) | Significant decreased lingering aftertaste, less bitterness up front, less green and licorice off-taste, decreased astringency, less peaky, more sugar-like, smoother, no significant reduction in overall sweetness |

Thus, among different non-sugar sweeteners, the *Emblica officinalis* fruit extract was particularly effective in masking the lingering effect of steviol glycosides.

Example V: Preparation and Evaluation of Mucic Acid 2-O-Gallate and Mucic Acid Lactone Gallate Mixtures of Different Ratios

*Emblica officinalis* fruit extract (Natreon Inc., New Jersey, U.S.) was heat-treated at a reduced pressure. The resulting material was recovered to afford a series of extract samples containing the mixtures of mucic acid 2-O-gallate and mucic acid lactone gallate of different weight ratios. The extract samples were then added to the αG SWEET solution (0.08%) to final concentrations of 50 and 80 ppm, respectively. Water was used in a control group.

The extract samples were subsequently evaluated by a group of panelists for their masking effect of lingering aftertaste of steviol glycosides and their suitability for flavor applications. The test results are as follows:

| | Mucic Acid Gallate Mixture (%) | | | |
|---|---|---|---|---|
| Sample | Mucic Acid 2-O-Gallate | Mucic Acid Lactone Gallate | Weight Ratio | Flavor Profile |
| 1 | 3.70 | 8.74 | 0.42 | Less aftertaste of bitter, metallic and lingering sweet but insufficient masking |
| 2 | 3.77 | 8.74 | 0.43 | Less aftertaste of bitter, metallic and lingering sweet but insufficient masking |
| 3 | 5.30 | 8.60 | 0.60 | Less bitter, metallic and lingering sweet but insufficient masking |
| 4 | 6.16 | 8.14 | 0.76 | Less aftertaste of bitter, metallic and lingering sweet, some masking |
| 5 | 7.80 | 7.41 | 1.05 | Less aftertaste of bitter, metallic and lingering sweet, strong masking |
| 6 | 8.20 | 7.70 | 1.06 | Less aftertaste of bitter metallic and lingering sweet, strong masking |
| 7 | 8.10 | 7.50 | 1.08 | Less aftertaste of bitter, metallic and lingering sweet, strong masking |
| 8 | 9.30 | 7.00 | 1.33 | Less aftertaste of bitter, metallic and lingering sweet, strong masking |
| 9 | 10.30 | 6.60 | 1.56 | Less aftertaste of bitter, metallic and lingering sweet, strong masking |
| 10 | 11.10 | 6.62 | 1.68 | Less aftertaste of bitter, metallic and lingering sweet, strong masking |
| 11 | 11.82 | 6.11 | 1.93 | Less aftertaste of bitter, metallic and lingering sweet, some masking |
| 12 | 11.38 | 5.68 | 2.00 | Less aftertaste of bitter, metallic and lingering sweet, some masking |
| 13 | 12.80 | 5.90 | 2.17 | Less aftertaste of bitter, metallic and lingering sweet, some masking |
| 14 | 13.26 | 5.77 | 2.30 | Less aftertaste of bitter, metallic and lingering sweet but insufficient masking |

The above evaluation yielded unexpected finding, samples 4-13 were surprisingly superior to samples 1-3 and 14. There was criticality to the mixing ratios of mucic acid 2-O-gallate and mucic acid lactone gallate. Specifically, only a mixture having a mucic acid 2-O-gallate and mucic acid lactone gallate weight ratio of from about 0.75-2.20 was found to possess desirable masking effect of lingering aftertaste of steviol glycosides and is suitable for flavor applications. A weight ratio outside the defined ranges caused insufficient masking which rendered the mucic acid 2-O-gallate and mucic acid lactone gallate mixture unsuitable for use in flavor applications. Thus, the present invention made surprising and unexpected discovery of the criticality of the weight ratios in mucic acid 2-O-gallate and mucic acid lactone gallate mixture.

What is claimed is:

1. A method of masking the lingering aftertaste of a non-sugar sweetener in a consumable containing the non-sugar sweetener comprising the step of adding an olfactory effective amount of a mixture of mucic acid 2-O-gallate and mucic acid lactone gallate, wherein the non-sugar sweetener is a steviol glycoside.

2. The method of claim 1, wherein the olfactory effective amount is from about 1 part per billion to about 1000 parts per million.

3. The method of claim 1, wherein the olfactory effective amount is from about 0.5 to about 100 parts per million.

4. The method of claim 1, wherein the compound is provided as an *Emblica officinalis* fruit extract.

5. The method of claim 1, wherein the mixture has a mucic acid 2-O-gallate and mucic acid lactone gallate weight ratio of from about 0.75 to 2.20.

6. A composition comprising a non-sugar sweetener and an olfactory effective amount of a mixture of mucic acid 2-O-gallate and mucic acid lactone gallate, wherein the non-sugar sweetener is a steviol glycoside.

7. The composition of claim 6, wherein the olfactory effective amount is from about 1 part per billion to about 1000 parts per million.

8. The composition of claim 6, wherein the olfactory effective amount is from about 0.5 to about 100 parts per million.

9. The composition of claim 6, wherein the compound is provided as an *Emblica officinalis* fruit extract.

10. The composition of claim 6, wherein the mixture has a mucic acid 2-O-gallate and mucic acid lactone gallate weight ratio of from about 0.75 to 2.20.

11. A consumable comprising a non-sugar sweetener and an olfactory effective amount of a mixture of mucic acid 2-O-gallate and mucic acid lactone gallate, wherein the non-sugar sweetener is a steviol glycoside.

12. The consumable of claim 11, wherein the consumable is a beverage.

13. The consumable of claim 11, wherein the compound is provided as an *Emblica officinalis* fruit extract.

14. The consumable of claim 11, wherein the mixture has a mucic acid 2-O-gallate and mucic acid lactone gallate weight ratio of from about 0.75 to 2.20.

* * * * *